(12) United States Patent
Abby et al.

(10) Patent No.: US 7,172,078 B2
(45) Date of Patent: Feb. 6, 2007

(54) COLUMN NETWORK HARDWARE MANAGEMENT SYSTEM

(75) Inventors: Marjana M. Abby, Kingston, RI (US); Robert C. Baxter, Warwick, RI (US); Alan C. Miller, Madison, CT (US); Nathaniel L. Herring, Norwich, CT (US)

(73) Assignee: Hubbell Incorporated, Orange, CT (US)

( * ) Notice: Subject to any disclaimer, the term of this patent is extended or adjusted under 35 U.S.C. 154(b) by 432 days.

(21) Appl. No.: 10/615,393

(22) Filed: Jul. 9, 2003

(65) Prior Publication Data

US 2005/0006323 A1    Jan. 13, 2005

(51) Int. Cl.
*A47F 7/00* (2006.01)

(52) U.S. Cl. ...................................................... 211/26

(58) Field of Classification Search .................. 211/26, 211/71.01; 361/826, 829; 312/265.4; 174/100; 385/123

See application file for complete search history.

(56) References Cited

U.S. PATENT DOCUMENTS

| | | | |
|---|---|---|---|
| 4,665,546 A | 5/1987 | Brey et al. | |
| 5,023,404 A | 6/1991 | Hudson et al. | |
| 5,323,916 A | 6/1994 | Salmon | |
| 5,326,934 A | 7/1994 | LeMaster et al. | |
| 5,586,012 A | 12/1996 | Lerman | |
| 5,683,001 A | 11/1997 | Masuda et al. | |
| 5,758,002 A | 5/1998 | Walters | |
| 5,765,698 A | 6/1998 | Bullivant | |
| 5,788,087 A | 8/1998 | Orlando | |
| 5,867,372 A | 2/1999 | Shie | |
| 5,921,402 A | 7/1999 | Magenheimer | |
| 6,011,221 A | 1/2000 | Lecinski et al. | |
| 6,223,909 B1 | 5/2001 | Mendoza | |
| 6,338,413 B1 | 1/2002 | Walter et al. | |
| 6,347,714 B1 | 2/2002 | Fournier et al. | |
| 6,489,565 B1 | 12/2002 | Krietzman et al. | |
| 6,520,345 B1 | 2/2003 | Marovic et al. | |
| 6,543,626 B1* | 4/2003 | Mendoza ..................... 211/26 |
| 6,600,665 B2* | 7/2003 | Lauchner ..................... 361/826 |
| 6,605,782 B1* | 8/2003 | Krietzman et al. ......... 174/101 |
| 6,946,605 B2* | 9/2005 | Levesque et al. ........... 174/100 |
| 2002/0162809 A1 | 11/2002 | Hartel | |
| 2003/0071002 A1 | 4/2003 | Hung | |

OTHER PUBLICATIONS

Hubbell Premise Wiring Full Line Catalog, pp. 1, 92, 93, 94 and 106; Nov. 1999.

* cited by examiner

*Primary Examiner*—Sarah Purol
(74) *Attorney, Agent, or Firm*—Roylance, Abrams, Berdo & Goodman, L.L.P.; Alfred N. Goodman

(57) ABSTRACT

A channel for managing equipment cables that includes opposing first and second members and a third member extending between and connecting the first and second members. Each of the first and second members includes first and second inner and outer surfaces. At least one cable receiving area is defined between the first and second inner surfaces of the first and second members. First and second equipment mounting elements extend from each of the first and second outer surfaces of the first and second members. The first and second equipment mounting elements are connectable to equipment. A base support is coupled to at least one of the first and second members.

8 Claims, 5 Drawing Sheets

COLUMN NETWORK HARDWARE MANAGEMENT SYSTEM

FIELD OF THE INVENTION

The present invention relates to a column network hardward management system designed to support electrical equipment and manage the cabling of the equipment. More specifically, self-supporting channels support the equipment and provide receiving areas for managing the cabling of the equipment.

BACKGROUND OF THE INVENTION

Conventional cable or hardware management systems and relay racks provide a method of supporting electrical equipment and managing the cabling associated with the equipment. Typically, these systems or racks are used in a termination closet for the management of telecommunication equipment.

Current cable or hardware management systems include separate channels that are mounted on the sides of the rack supporting the equipment, as disclosed in U.S. Pat. No. 6,347,714 to Fournier et al., the subject matter of which is hereby incorporated by reference. Fournier et al. discloses a rack 20 including left and right vertical members 22 and 28 that support cross-connect products. Left and right cable management channels 60 are mounted onto the sides of vertical members 22 and 28 by clips 100. A single base 38 provides support for rack 20 and channels 60 mounted thereto.

These current systems, however, are costly due to the requirement of multiple racks and channels to support the electrical equipment. Additionally, assembly of the current systems is inefficient because numerous parts, such as racks, channels and equipment, must be assembled.

Examples of other conventional cable management systems include U.S. Pat. No. 6,520,345 to Marovic et al., U.S. Pat. No. 6,489,565 to Kreitzman et al., U.S. Pat. No. 6,011,221 to Lecinski et al., U.S. Pat. No. 5,758,002 to Walters, U.S. Pat. No. 5,683,001 to Masuda et al., and U.S. Pat. No. 5,323,916 to Salmon, and U.S. Patent Application Publication No.2002/0162809 A1 to Hartel, the subject matter of each of which is herein incorporated by reference.

SUMMARY OF THE INVENTION

Accordingly, an object of the present invention is to provide a column network hardware management system that efficiently supports electrical equipment and manages the cabling of the equipment.

Another object of the present invention is to provide a column network hardware management system that is less costly than current systems.

Yet another object of the present invention is to provide a column network hardware management system that eliminates separate racks for supporting the equipment.

The foregoing objects are basically attained by a channel for managing equipment cables that includes opposing first and second members and a third member extending between and connecting the first and second members. Each of the first and second members includes first and second inner and outer surfaces. At least one cable receiving area is defined between the first and second inner surfaces of the first and second members. The first and second equipment mounting elements extend from each of the first and second outer surfaces of the first and second members. First and second equipment mounting elements are connectable to equipment. A base support is coupled to at least one of the first and second members.

The foregoing objects are also attained by a channel for managing equipment cables that includes opposing first and second members and a third member extending between said first and second members. The first, second and third members form an I-shaped section transverse to a longitudinal axis of the first and second members. Each of the first and second members includes first and second inner and outer surfaces, respectively. Cable receiving areas are defined between the first and second inner surfaces of the first and second members with the third member being located between the first and second receiving areas. First and second equipment mounting elements extend from each of the first and second outer surfaces of the first and second members. The first and second equipment mounting elements are connectable to the equipment. A base support is coupled to one of the first and second members.

The foregoing objects are also attained by a cable management system that includes a first channel with opposing first and second members and a third member extending between the first and second members. Each of the first and second members includes inner and outer surfaces. At least one cable receiving area is defined between the inner surfaces of the first and second members. A first equipment mounting element extends from one of the outer surfaces of the first and second members. A base support is coupled to at least one of the first and second members. A second channel is coupled to the first channel and includes opposing first and second members and a third member extending between the first and second members. The first and second members include inner and outer surfaces. At least one cable receiving area is defined between the inner surfaces of the first and second members of the second channel. A second equipment mounting element extends from one of the outer surfaces of the first and second members of the second channel. A base support is coupled to at least one of the first and second members of the second channel. The first and second equipment mounting elements of the first and second channels, respectively, are connectable to opposing ends of equipment.

Other objects, advantages and salient features of the invention will become apparent from the following detailed description, which, taken in conjunction with annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
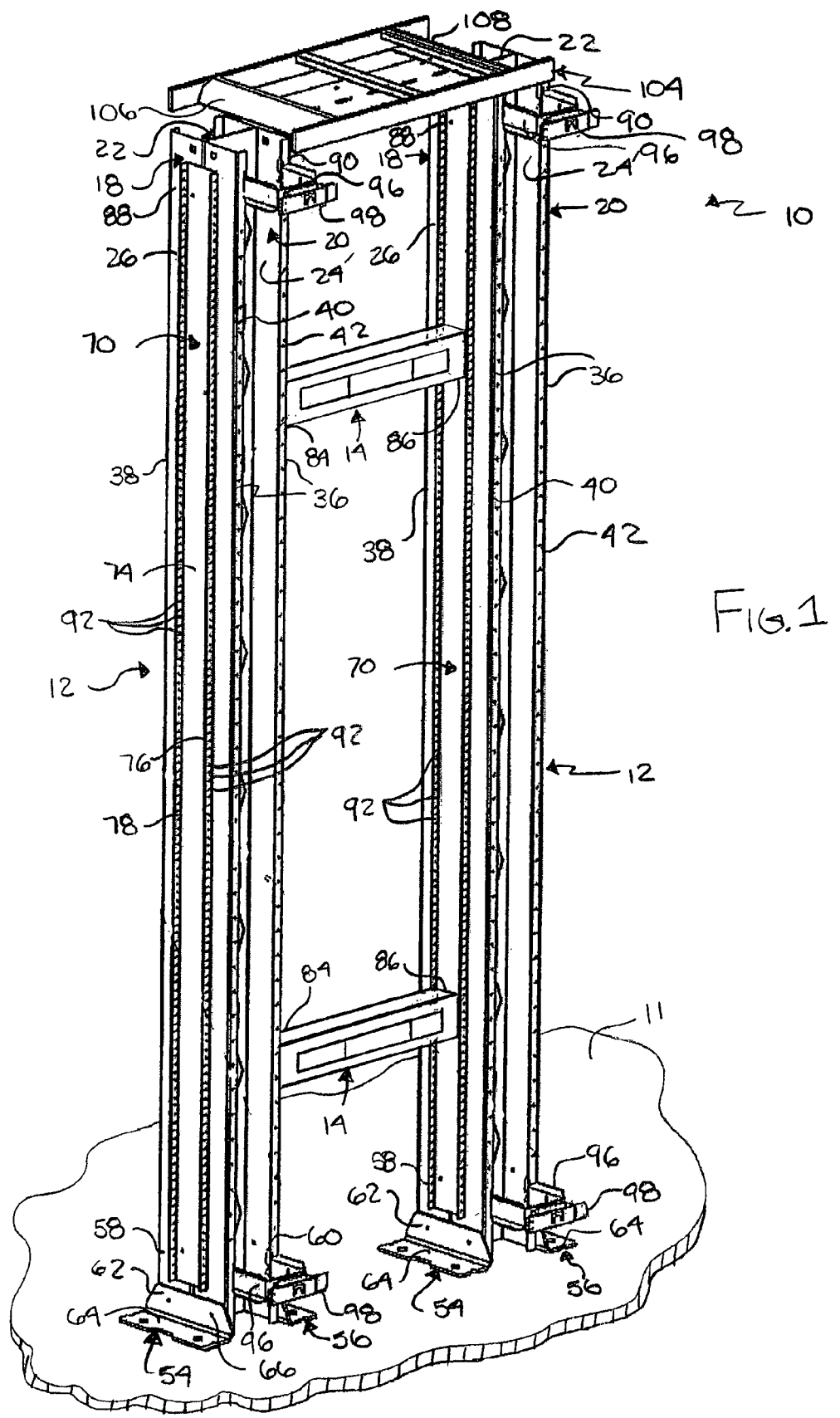
FIG. 1 is a perspective view of a cable management system in accordance with a preferred embodiment of the present invention.

Referring to FIGS. 1–5, a management system 10 according to a preferred embodiment of the present invention integrates the functions of a rack for supporting electrical equipment and channels for managing cabling of the equipment. More specifically, system 10 includes management channels 12 that both support electrical equipment 14 and manage cabling 16 of the equipment, thereby eliminating the necessity of a separate equipment rack. Channels 12 are supported on a surface, such as floor 11.

Figure 3:
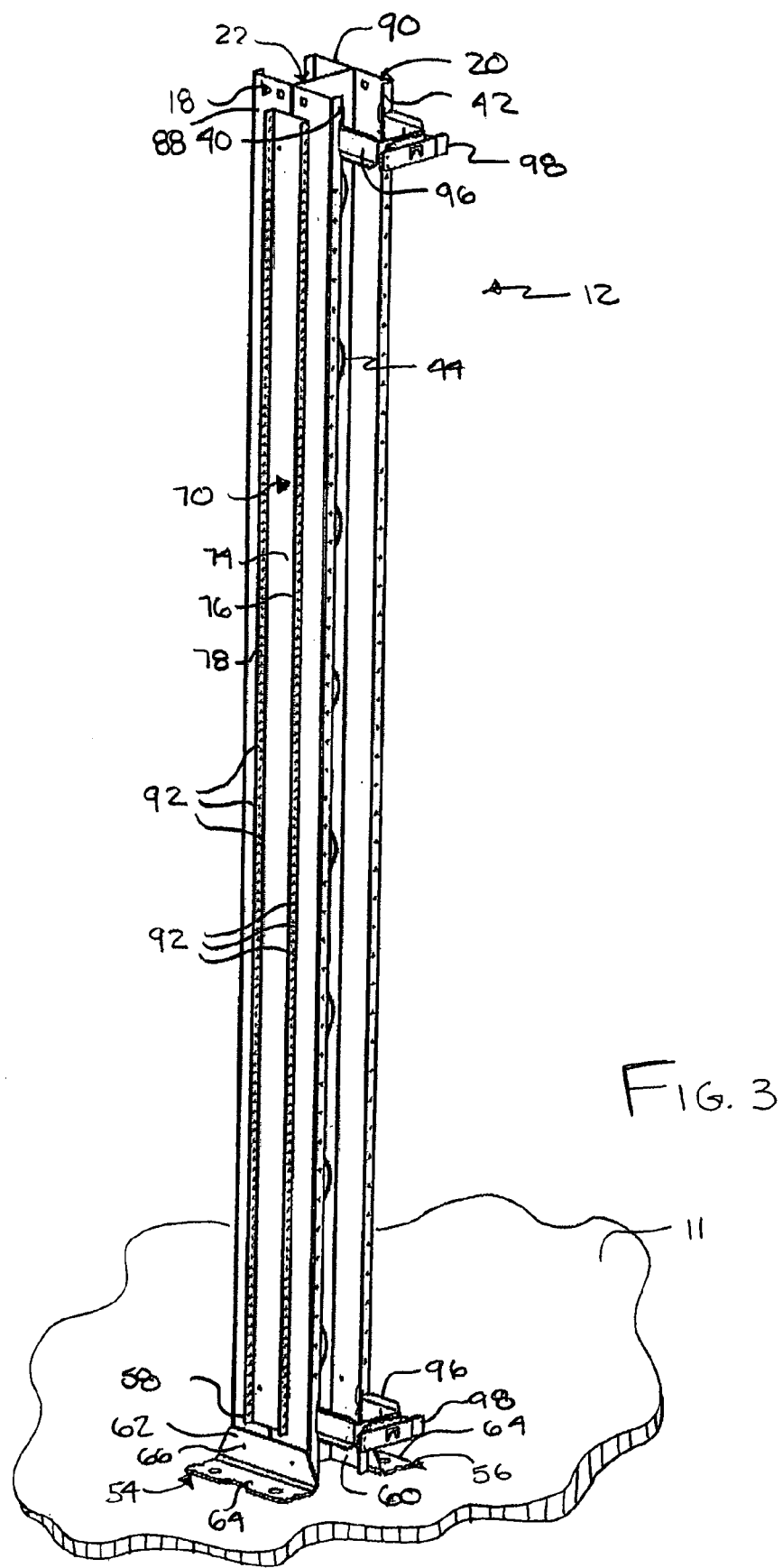
FIG. 3 is a perspective view of a channel of the cable management system illustrated in FIG. 1.
Figure 4:
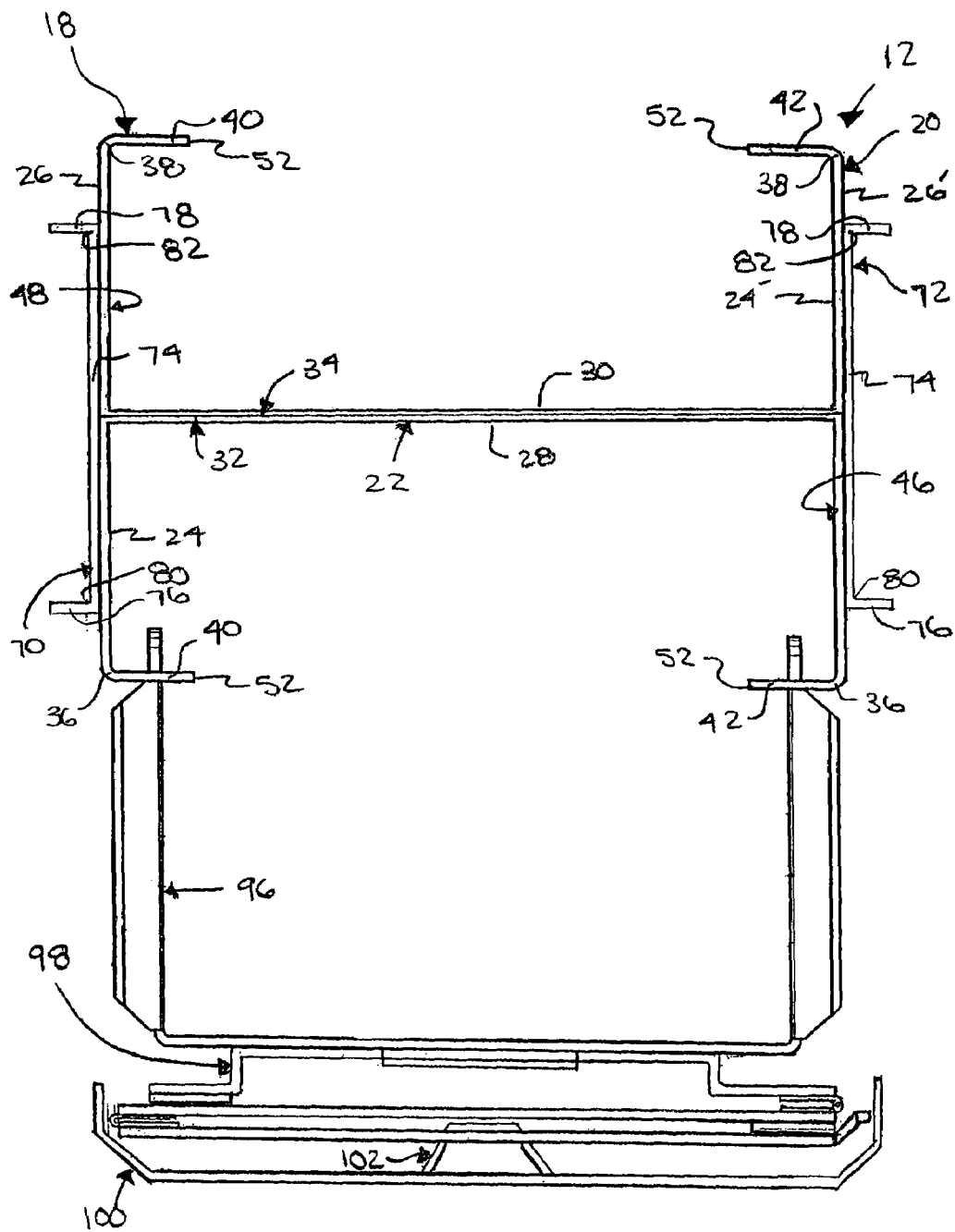
FIG. 4 is a top plan view of the channel illustrated in FIG. 3.

As seen in FIG. 3, each management channel 12 includes first and second vertical members 18 and 20. A third member 22 extends between and connects first and second vertical members 18 and 20. First, second and third members 18, 20 and 22 preferably form an I-shaped channel in section transverse to the longitudinal axis of channel 12, as seen in FIG. 4. However, first, second and third members 18, 20 and 22 can form any shaped channel, such as a Z-shaped or C-shaped channel. Each of first and second members 18 and 20 are substantially planar and include inner and outer surfaces 24 and 26 and 24' and 26', respectively, as best seen in FIG. 4. Third member 22 is also substantially planar and includes opposite first and second surfaces 28 and 30.

Each channel 12 is preferably formed by welding together two C-shaped sections 32 and 34 which each comprise the first, second and third members 18, 20, 22 to produce the I-shape of each channel 12, as seen in FIG. 4. Alternatively, opposing sides edges the third member 22 can be connected, such as by welding, to the inner surfaces 24 and 24' of first and second vertical members 18 and 20. Also, first, second and third members 18, 20 and 22 can be made as a unitary one-piece channel.

Opposite first and second side edges 36 and 38 of first and second members 18 and 20 include terminal flanges 40 and 42, respectively, extending inwardly therefrom, as seen in FIGS. 1, 3 and 4. Flanges 40 of first vertical member 18 extend toward flanges 42 of second member 20 and vice versa. First and second cable receiving areas 46 and 48 are located between first, second and third members 18, 20 and 22. Third member 22 includes a plurality of apertures 44 providing access between first and second cable receiving areas 46 and 48. First cable receiving area 46 is defined by inner surfaces 24 and 24' of first and second members 18 and 20 and first surface 28 of third member 22. An access opening 50 for first cable receiving area 46 is defined between flanges 40 and 42 of first side edges 36 of first and second members 18 and 20. Second cable receiving area 48 is defined by inner surfaces 24 and 24' and second surface 30 of third member 22. An access opening 52 for second cable receiving area 48 is defined between flanges 40 and 42 of second side edges 38. Access openings 50 and 52 provide access to first and second cable receiving areas 46 and 48, thereby facilitating management of cabling received by areas 46 and 48.

Each channel 12 is self-supported by first and second base supports or feet 54 and 56 coupled to and extending from first and second members 18 and 20 at the ends 58 and 60 thereof, as best seen in FIG. 3. Alternatively, first and second feet 54 and 56 can form a single foot coupled to first and second members 18 and 20 for supporting channel 12. Each foot 54 and 56 is L-shaped with first and second sections 62 and 64. First sections 62 are coupled to ends 58 and 60 of first and second members 18 and 20, respectively, by any know attachment mechanism, such as fasteners 66. Second sections 64 extending outwardly from first sections 62 at substantially right angles providing the support surfaces for channels 12.

Figure 5:
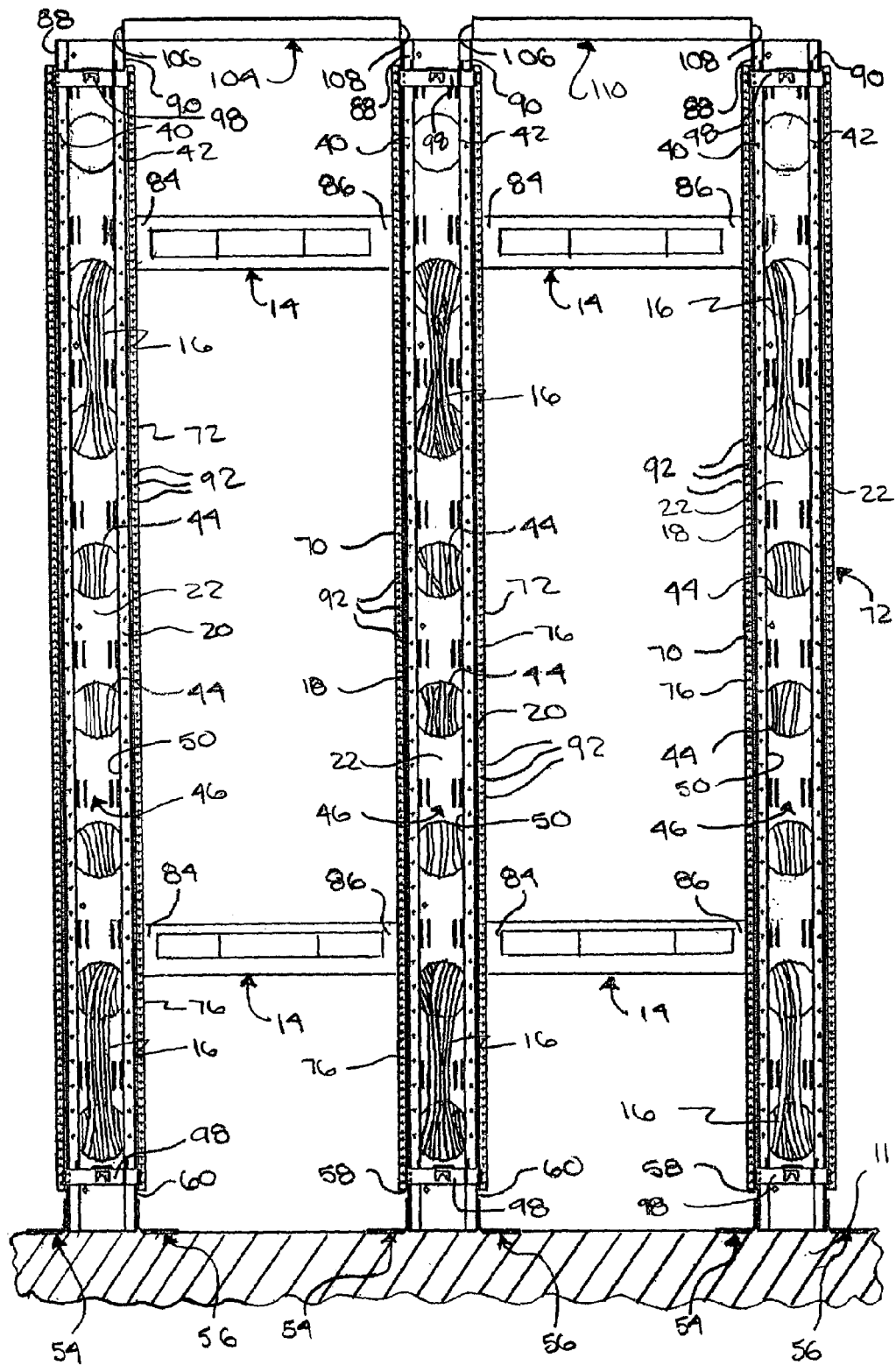
FIG. 5 is a side elevational view of the cable management system illustrated in FIG. 1 with an additional channel added to the system.

As seen in FIGS. 1, 4 and 5, first and second equipment mounting elements 70 and 72 extend from outer surfaces 26 and 26' of first and second members 18 and 20, respectively, of each channel 12 for supporting electrical equipment 14, such as cross over products, computer and telecommunications equipment. Each equipment mounting element 70 and 72 is preferably U-shaped with a main section 74 and first and second lips 76 and 78 extending from opposite sides 80 and 82 of main section 74. However, mounting elements 70 and 72 can be any known mounting mechanism, such as clips or brackets. Main sections 74 of each mounting element 70 and 74 are sized to accommodate the ends 84 and 86 of equipment 14, as best seen in FIG. 1. The main sections 74 of each mounting element 70 and 72 are attached to outer surfaces 26 of members 18 and 20, respectively, by any known attachment, such as welding. Lips 76 and 78 include threaded mounting holes 92 for mounting equipment 14. Specifically, fasteners can be threaded into holes 92 and into equipment 14. Mounting elements 70 and 72 preferably extend continuously for generally the entire length of members 18 and 20 between ends 58 and 60 and opposite ends 88 and 90. Alternatively, mounting elements 70 and 72 can be discontinuous, that is include separate spaced sections.

Figure 2:
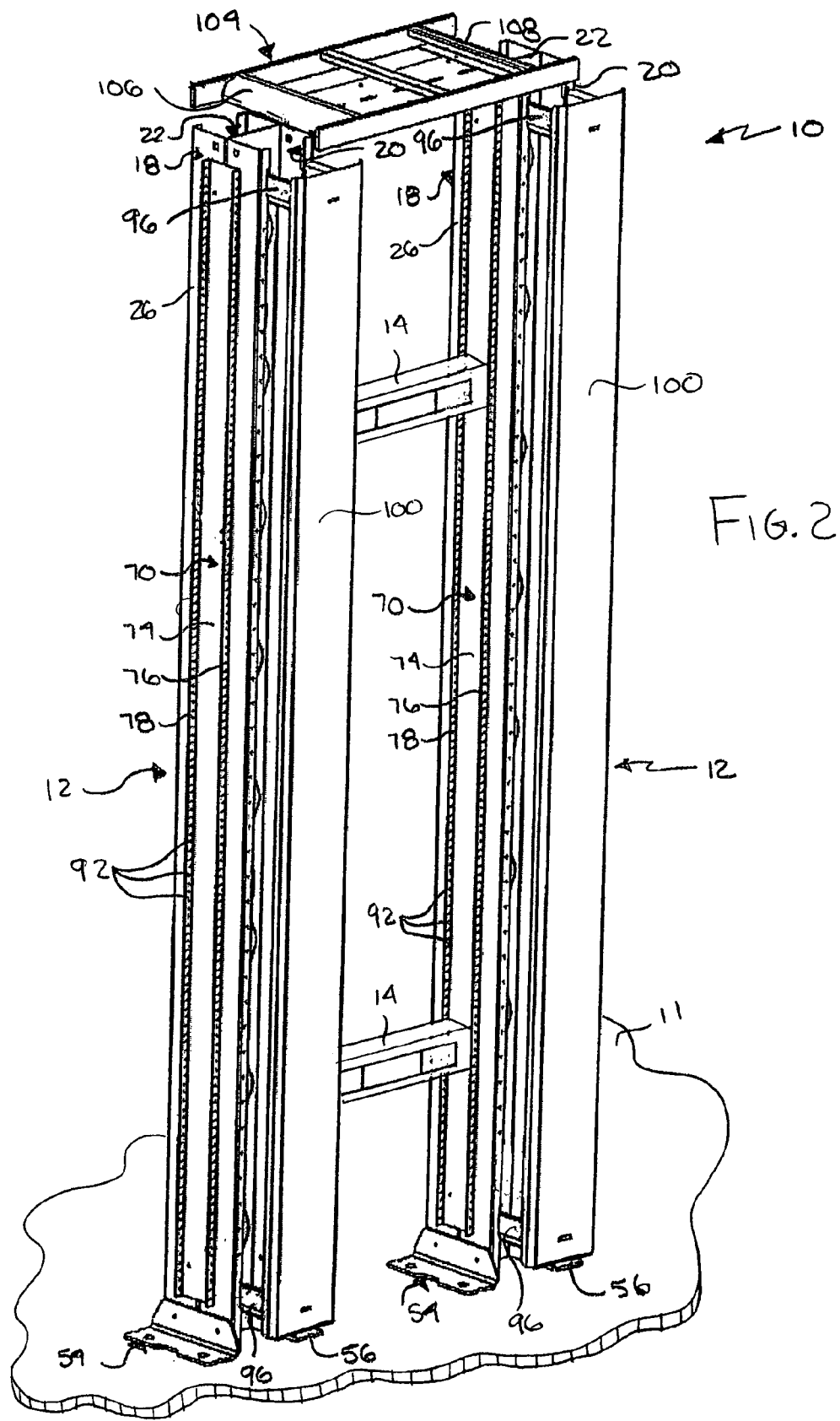
FIG. 2 is a perspective view of the cable management system illustrated in FIG. 1, showing gates and covers included with the system.

As seen in FIGS. 1, 2 and 4, gates 96 are provided across each cable receiving areas 46 and 48 of each channel 12 for retaining cabling 16 within receiving areas 46 and 48 and supporting double hinged brackets 98. Gates 96 extend across each access opening 50 and 52 of receiving areas 46 and 48 and are connected to flanges 40 and 42 of first and second members 18 and 20. Gates 96 are identical to gates 140 of U.S. Pat. No. 6,347,714 of Fournier et al. and are mounted to flanges 40 and 42 in the same manner as gates 140 are mounted to walls 64 and 76 of channels 60 of Fournier et al.

Double hinged brackets 98 are releasably coupled to gates 96 and support covers 100. Covers 100 cover cable receiving areas 46 and 48 of each channel 12 to hide cabling 16. Covers 100 are substantially similar to covers 180 of Fournier et al. except for covers 100 extend generally the entire length of each channel 12, as seen in FIG. 2. Lances 102 extend from the back surfaces of covers 100 and releasably engage the hinged brackets 98, as seen in FIG. 4. Brackets 98 allow the covers 100 to be opened in either lateral direction facilitating access to cable receiving areas 46 and 48, as described in co-pending and commonly assigned U.S. patent application Ser. No. 10/615,401 to Nancy J. Richards et al. entitled Hinged Swing Bracket Assembly for a Rack System, filed concurrently herewith, the subject matter of which is hereby incorporated by reference.

Assembly

Referring to FIGS. 1–5, cable management system 10 preferably includes equipment 14 mounted between two channels 12, as seen in FIG. 1. Since each channel 12 includes base support feet 54 and 56, channels 12 are self-supporting and no other support structure is required. As an option, a support member, such as top support bracket 104, can be employed to provide additional rigidity to system 10. Bracket 104 extends between the two channels 12 remote from the base support feet 54 and 56 of each channel 12, as seen in FIGS. 1 and 5. A first end 106 of bracket 104 is coupled to one of first and second members 18 and 20 of the first channel 12 and a second end 108 opposite first end 106 is coupled to one of first and second members 18 and 20 of the second channel 12 by any known attachment, such as fasteners (not shown). For example, bracket first end 106 is coupled to second member 20 of the first channel 12 at end 90 of member 20 and bracket second end 108 is coupled to first member 18 of the second channel at end 88 of member 18, as seen in FIG. 5. Preferably, first and second ends 106 and 108 are bolted to first and second channels 12, respectively.

Equipment 14 is mounted to equipment mounting elements 70 and 72 of the first and second channels 12 by inserting and threading fasteners through mounting holes 92 of lips 76 and 78 and into equipment 14. The first end 84 of equipment 14 is mounted to one of first and second members 18 and 20 of the first channel 12 and second end 86 is mounted to one of the first and second members 18 and 20 of the second channel 12. For example, equipment first end 84 is mounted to element 72 via lips 76 and 78 of second member 20 of first channel 12 and equipment second end 86 is mounted to element 70 of first member 18 of second channel 12. Cabling 16 is then routed through access openings 50 and 52 and into cable receiving areas 46 and 48, as seen in FIG. 5. Covers 100 can then be hung on hinges 98 of gates 96 of each channel 12 by hooking lances 102 onto hinges 98, thereby covering cable receiving areas 46 and 48 and cabling 16.

As seen in FIG. 5, additional channels 12 can be added to system 10 to support additional equipment 14. For example, a third channel 12 can be employed to support equipment 14 between the second channel 12 and the third channel 12 in the same manner described above with respect to equipment 14 supported between the first and second channels 12. Specifically, equipment first end 84 can be mounted to element 72 via lips 76 and 78 of second member 20 of second channel 12 and equipment second end 86 is mounted to element 70 of first member 18 of third channel 12. Another support bracket 110 can be provided between the second and third channels 12 in the same manner as described above with respect to support bracket 104. Any number of channels 12 can be added to system 10 to support additional equipment along with corresponding top support brackets.

While a particular embodiment has been chosen to illustrate the invention, it will be understood by those skilled in the art that various changes and modifications can be made therein without departing from the scope of the invention as defined in the appended claims.

What is claimed is:

1. A management system for managing equipment and equipment and cables, comprising:
   a first channel including opposing first and second members and a third member extending between said first and second members, each of said first and second members including inner and outer surfaces, at least one cable receiving area being defined between said inner surfaces of said first and second members, a first equipment mounting element extending from one of said outer surfaces of said first and second members, and a base support coupled to at least one of said first and second members; and
   a second channel coupled to said first channel and including opposing first and second members and a third member extending between said first and second members, each of said first and second members including inner and outer surfaces, at least one cable receiving area being defined between said inner surfaces of said first and second members of said second channel, a second equipment mounting element extending from one of said outer surfaces of said first and second members of said second channel, and a base support coupled to at least one of said first and second members of said second channel,
   whereby said first and second equipment mounting elements of said first and second channels, respectively, are connectable to opposing ends of equipment.

2. A management system according to claim 1, wherein a support member extends between said first and second channels remote from said base supports.

3. A management system according to claim 1, wherein each of said channels are self-supported by said base supports.

4. A management system according to claim 1, wherein said base supports of said first and second channels, respectively, are separate from one another.

5. A management system according to claim 1, wherein the ends of the equipment are directly mounted to the first and second equipment mounting elements of said first and second channels, respectively.

6. A management system according to claim 1, wherein said first equipment mounting element extends from said outer surface of said second member of said first channel; and
   said second equipment mounting element extends from said outer surface of said first member of said second channel.

7. A management system according to claim 1, wherein a third equipment mounting element extending from the other of said outer surfaces of said first and second members of said first channel; and
   a fourth equipment mounting element extending from the other of said outer surfaces of said first and second members of said second channel.

8. A management system according to claim 1, wherein a third channel coupled to one of said first and second channels and including opposing first and second members and a third member extending between said first and second members, each of said first and second members including inner and outer surfaces, at least one cable receiving area being defined between said inner surfaces of said first and second members of said third channel, a third equipment mounting element extending from one of said outer surfaces of said first and second members of said third channel, and a base support coupled to at least one of said first and second members of said third channel.

* * * * *